United States Patent Office 2,735,377
Patented Feb. 21, 1956

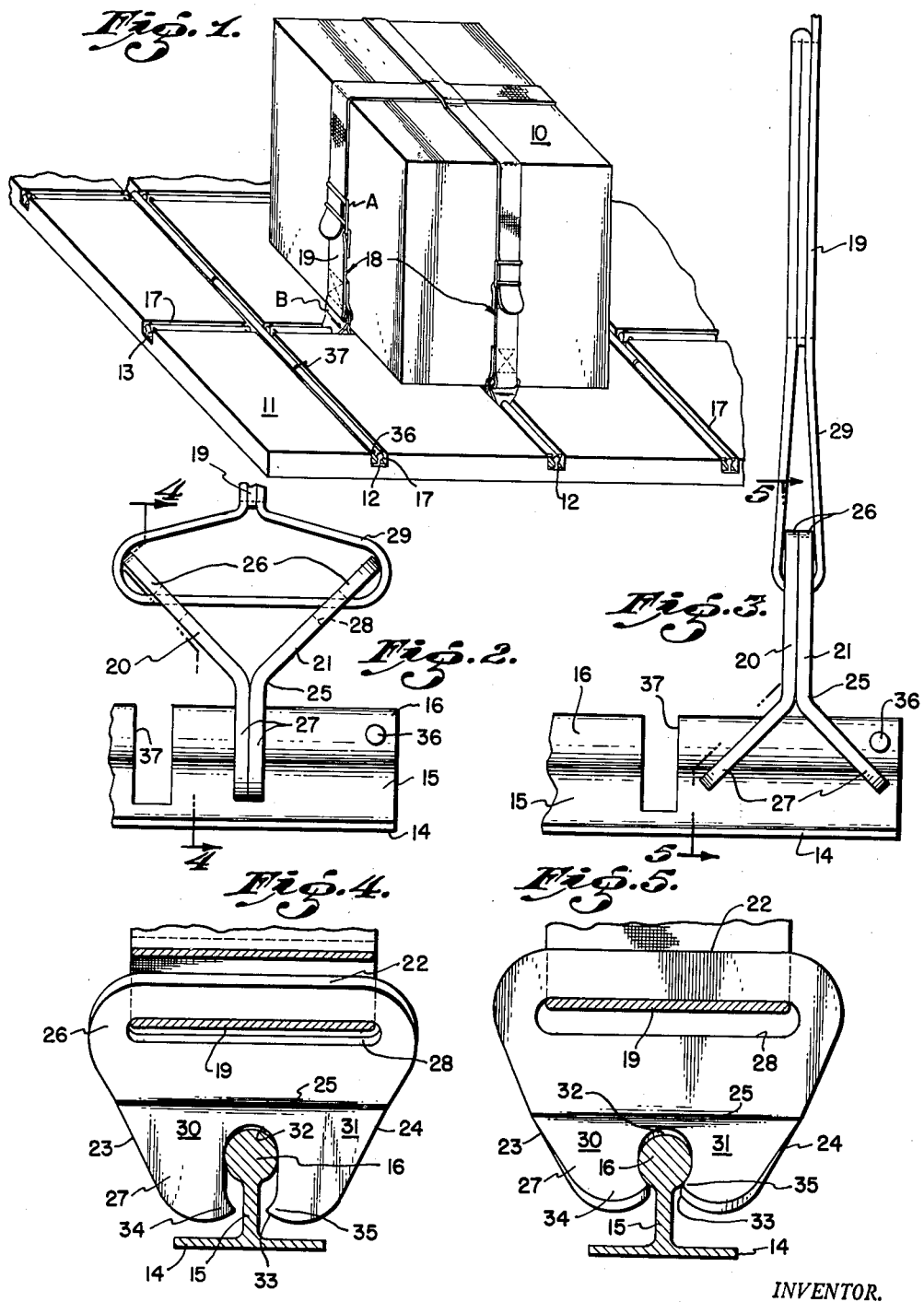

2,735,377

CARGO TIE-DOWN

Edwin C. Elsner, Glendale, Calif., assignor to C. J. W. Corporation, North Hollywood, Calif., a corporation of California Application November 9, 1950, Serial No. 194,748

3 Claims. (Cl. 105—369)

The present invention relates generally to securing devices and is more particularly concerned with devices for the securing and tying down of cargoes.

Although the invention is especially suited for utilization in aircraft, it is susceptible of general application, and may be utilized, for example, in connection with rail cars, trucks, ships and other vehicles used for the transportation and shipment of goods.

One object of the herein described invention is to provide cargo tie-down means of simple construction, which is easy to operate and may be quickly attached and detached without the use of tools; which occupies a minimum of space and is so constructed that crates, containers, and the like may be closely packed, thus conserving valuable cargo space.

A further object of the invention is to provide a cargo securing arrangement, wherein the tie-down is combined with a rail system which permits a high degree of flexibility of securement in the cargo spaces.

Also, it is an object to provide a securing device of novel construction which may be utilized to releasably connect elongate straps of webbing or other suitable material across cargo spaces, or the like to form a bulkhead or partition therein, and which may be easily shifted as necessary.

Still another object is to provide an improved article of manufacture in the form of a securing device, which may be economically fabricated from plate material and which is devoid of moving parts.

Further objects of the invention will be brought out in the following part of the specification, wherein detailed description is for the purpose of fully disclosing the invention without placing limitations thereon.

Referring to the accompanying drawings which are for illustrative purposes only:

Fig. 1 is an oblique fragmentary view illustrating the manner of utilizing the present invention for securing cargo to the deck or flooring of a cargo space;

Fig. 2 is a side view showing the initial position of the connector of the tie-down, which permits its cooperative association with an anchor member, such as a rail;

Fig. 3 is a similar view showing the position of the connector parts when clamped to the rail and secured against movement thereon;

Fig. 4 is a sectional view, taken substantially on line 4—4 of Fig. 2; and

Fig. 5 is a sectional view taken substantially on line 5—5 of Fig. 3.

Referring now to the drawings, for illustrative purposes there is shown in Fig. 1 a cargo package or container 10 which is secured against shifting movement to a platform 11 which may constitute the deck or floor of a cargo space in aircraft or other vehicle such as might be used for the shipment or transportation of goods.

The platform 11 is shown as being traversed by a plurality of rail members 12 and 13, which are depicted as respectively extending longitudinally and transversely of the cargo space at right angles to each other.

These rails may be of continuous length, as in the case of rails 12, or may constitute short sections, as in the case of rails 13 which are discontinued adjacent the rails 12. In either case, the rails are of conventional type having a base flange 14, an upstanding web 15 and a head 16 of circular cross-section. The rails are mounted in suitable grooves or channels 17 of sufficient depth to place the head portion of the rail flush with the upper surface of the platform 11, or slightly below this surface so as not to interfere with the proper seating and contact of cargo with the platform surface.

As clearly shown in Fig. 1, the cargo package 10 is secured in desired location in the cargo space by means of one or more tie-down devices, as generally indicated at 18.

In general the tie-down devices comprise elongate straps 19 of webbing or other suitable flexible material, these straps being interconnectible by means of suitable buckles as shown at (A). The straps are placed over the cargo, as in this case package 10, and are anchored to an adjacent rail 12 or 13 by means of end connectors (B).

More specifically, as shown in Figs. 2–5 inclusive the connectors are composed of a pair of cooperatively associated members 20 and 21 of identical construction.

Each member is fabricated from suitable metal plate material and is generally of triangular shape having side edges 22, 23 and 24, the edge 22 forming one end of the plate and the edges 23 and 24 forming converging side edges. Each plate member is deformed between its ends by bending along a line 25 so as to provide angularly extending first and second end portions 26 and 27, respectively.

The end portion 26 is provided with an elongate transversely extending opening 28 which is adapted to have the strap 19 threaded therethrough and formed into an end loop 29.

The end 27 is provided with spaced legs 30 and 31 which makes this end of the plate bifurcate. The space between the legs 30 and 31 defines an elongate notch or slot 32 of greater length than width, this notch adjacent the leg ends being in communication with a restricted entrance 33 which is secured by inwardly extending the end margins of the legs towards each other so as to form the lip-like projections 34 and 35.

As shown in Figs. 1, 2 and 3, it will be noted that the rails 12 and 13 are provided at their ends with stop pins 36 which prevent moving the connectors endwise from the rails. For attaching the connectors to the rails, the rails are provided at intervals with slots 37 which extend through the rail head and into the web of the rail sufficiently to receive the end portions 27—27 of the members 20 and 21 edgewise thereinto sufficiently to dispose the rail head portion in the notch 32 and the restricted entrance 33 at the web portion of the rail, as shown in Fig. 4. Of course, it will be appreciated that in order to insert the end portions 27—27 into the slot 37, the portions 27—27 must be in face contact as shown in Fig. 2.

In the position shown in Fig. 2, it will be noted that the end portions 26—26 will be in divergent relationship. As thus positioned on the associated rail, the connectors may be moved longitudinally thereof to any desired position. When it is desired to clamp the connectors in desired position to the rail, it is only necessary to put a tension on the associated strap 19. This will act to draw the end portions 26—26 into engagement, and move the end portion 27—27 into divergent position, as shown in Fig. 3, the members 20 and 21 being actuated with a rocking movement.

In the position shown in Fig. 3, the connectors will be clamped to the associated rail, the edges defining the notch 32 in the end portions 27—27 being moved into gripping engagement with the rail head 16 substantially throughout their length, in each case.

Tension is applied to the strap 19 by interconnecting strap sections through a suitable buckle (A).

Referring again to Fig. 1, it will be apparent that the buckle (A) and the end connectors (B) take up very little space, so that the cargoes may be secured close together, thus conserving valuable cargo space. The tie-down arrangement of the present invention is extremely easy to utilize, and the connectors may be quickly connected and disconnected to the rails without the use of tools or special equipment.

While in the foregoing, the invention has described a connector which utilizes a pair of members, namely, members 20 and 21, which are cooperatively associated in back-to-back rocking relationship, the straps may be fitted with a single member by means of which it may be connected to an associated rail. Such an arrangement is possible due to the angular relationship of the respective ends of each connector plate. Tension forces applied to the strap 19 will tend to move the end portion 26 into the plane of the strap, and in so doing will incline the end portion 27 from a position normal to the axis of the associated rail to a position inclined to the rail axis. The end portion 27 is thus moved into clamping engagement in the same manner as previously described.

When a single member is utilized for the connector, it is preferable to incline the slot 37, instead of making it normal to the rail axis. Utilizing an inclined slot under such conditions decreases the possibility of the connector inadvertently becoming detached from the rail as it is slid therealong during adjustments.

The tie-down devices which have been described herein may also be utilized for providing a bulkhead or partition in the cargo spaces. It is believed readily apparent from the previous description that if other walls of the cargo space, for example, the side walls and ceiling are provided with rails as described for the floor or deck, a plurality of straps 19 may be secured between the wall rails in such a manner as to extend across the cargo compartment. In this way, by utilizing a plurality of transversely extending straps, a bulkhead or partition may be provided at any desired point across the cargo compartment, depending only upon the positioning of the rails.

I claim:

1. An article of manufacture, comprising: a substantially triangular plate having an elongate slot extending along one edge margin for receiving a strap member therethrough, said plate being deformed along a bend line parallel to said slot to angularly position the corner portion lying opposite said slot, said corner portion having a notch opening into the outer edge of the corner and defining at said notch opening spaced inwardly extending lip projections adapted to grip a member positioned in the notch, when the plate is tilted, said notch having a greater length than width and being positioned with its length axis normal to said bend line.

2. A holding device, comprising: a pair of cooperative connectors, each being deformed along a transverse bend line to provide angularly disposed opposite end portions, said connectors being adapted to be positioned in back-to-back rocking engagement, and having one set of their corresponding adjacent ends each formed with an open ended elongate notch at right angles to said bend line defining an edge terminating in spaced inwardly extending lip projections at the open end of said notch, said edges being adapted to assume non-gripping positions with respect to an elongate member positioned in said notches when the associated end portions are in parallel relation, and assume gripping positions relative thereto when the associated end portions are in divergent relation; and a flexible strap having a looped portion connected with the other corresponding ends of said connectors, adapted upon application of a pulling force on the strap to move said connectors to a gripping position of said edges and anchor said connectors against unitary movement along the associated elongate member.

3. A device for releasably anchoring a flexible member to a rail member having a head portion of circular cross-section, comprising: a pair of strap-like connectors, each being bent between its ends along a bend line to form angularly extending first and second end portions, said connectors being assembled in back-to-back relation for rocking movements at said bend lines with the first end portions adjacent and the second end portions adjacent, said second end portions each having an elongate open ended notch at right angles to its bend line for receiving the rail head portion therethrough, and said notches each having an edge terminating at its open end in inwardly extending spaced apart lip projections cooperating in divergent positions of the second end portions to continuously engage and grip the rail head substantially throughout its length so as to anchor the connectors against any movement along the rail, but permit movement of the connectors along the rail when the second end portions are in parallel relation, said first end portions having openings through which the flexible member is adapted to be looped so as to move the second end portions into said divergent positions when a pulling force is exerted on the flexible member, and enable movement of the second end portions to parallel relation when the pulling force is released on said flexible member.

References Cited in the file of this patent

UNITED STATES PATENTS

| | | |
|---|---|---|
| 186,988 | Chilcott | Feb. 6, 1877 |
| 1,505,220 | Shay | Aug. 19, 1924 |
| 1,815,644 | Anderson | July 21, 1931 |
| 2,052,914 | Williams | Sept. 1, 1936 |
| 2,271,250 | Bucholz | Jan. 27, 1942 |
| 2,271,504 | Keys | Jan. 27, 1942 |
| 2,461,417 | Fallone | Feb. 8, 1949 |
| 2,605,064 | Davis | July 29, 1952 |